(12) United States Patent
Sawano et al.

(10) Patent No.: US 8,815,205 B2
(45) Date of Patent: Aug. 26, 2014

(54) METHOD FOR PRODUCING SPHERICAL ALUMINA POWDER

(75) Inventors: Kiyoshi Sawano, Tokyo (JP); Atsuhiko Imai, Himeji (JP); Takayuki Kashihara, Himeji (JP); Yusuke Kawamura, Niihama (JP); Hiroshi Takahashi, Niihama (JP)

(73) Assignees: Nippon Steel & Sumikin Materials Co., Ltd., Tokyo (JP); Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/086,497

(22) Filed: Apr. 14, 2011

(65) Prior Publication Data

US 2011/0256051 A1  Oct. 20, 2011

(30) Foreign Application Priority Data

Apr. 15, 2010 (JP) ................... 2010-094402

(51) Int. Cl.
 *C01F 7/02* (2006.01)
(52) U.S. Cl.
 USPC ........................................ 423/625
(58) Field of Classification Search
 USPC .................. 423/625, 629
 See application file for complete search history.

(56) References Cited

U.S. PATENT DOCUMENTS

| | | | | |
|---|---|---|---|---|
| 6,096,414 A * | 8/2000 | Young | ............ | 428/220 |
| 2006/0140851 A1 | 6/2006 | Onishi | | |
| 2011/0009544 A1* | 1/2011 | Funahashi | ............ | 524/261 |
| 2011/0315434 A1 | 12/2011 | Kawamura | | |

FOREIGN PATENT DOCUMENTS

| | | |
|---|---|---|
| CA | 1328728 | 4/1994 |
| CN | 1735564 A | 2/2006 |
| CN | 1 0231 721 1 A | 1/2012 |
| JP | 60-246220 A | 12/1985 |
| JP | 11-92136 A | 4/1999 |
| JP | 11-147711 A | 6/1999 |
| JP | 2001-19425 A | 1/2001 |
| JP | 2001-226117 A | 8/2001 |
| JP | 4209041 B2 | 10/2008 |
| WO | 2009/136542 | * 11/2009 |
| WO | 2009/0136542 A1 | 11/2009 |

OTHER PUBLICATIONS

Chinese Office Action dated Jan. 28, 2014 issued in patent application No. 201110157941.2.

* cited by examiner

*Primary Examiner* — Steven Bos
(74) *Attorney, Agent, or Firm* — Sughrue Mion, PLLC

(57) ABSTRACT

A production method comprising the steps of: spraying an aluminum hydroxide powder having a specific surface area measured by a nitrogen adsorption method of 0.3 m²/g or more and 3 m²/g or less; a ratio of an average particle diameter D50, which is a particle diameter at which 50% by weight of particles from the finest particle side are accumulated in a particle diameter distribution measured by a laser diffraction scattering method, to a sphere conversion particle diameter Dbet calculated from a specific surface area, of 10 or less; and the average particle diameter D50 of 2 μm or more and 100 μm or less, into flames, and then collecting it in the form of a powder to give a spherical alumina powder having a small specific surface area and a low uranium content, and capable of providing high thermal conductivity to resin compositions.

5 Claims, 1 Drawing Sheet

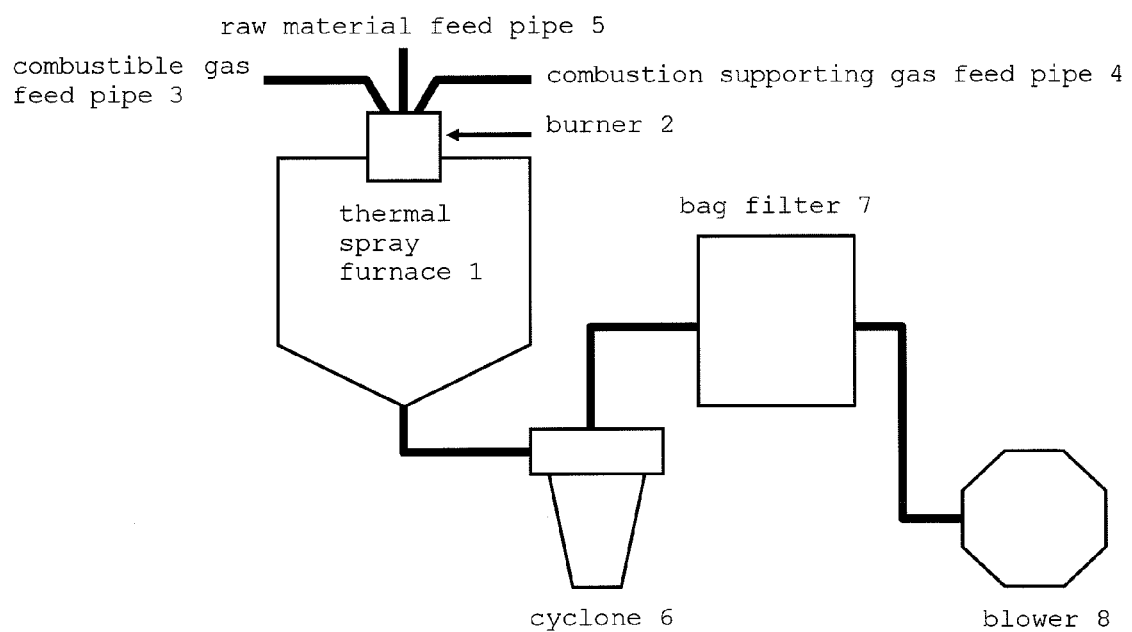

METHOD FOR PRODUCING SPHERICAL ALUMINA POWDER

FIELD OF THE INVENTION

The present application is filed, claiming the Paris Convention priorities based on the Japanese Patent Application No. 2010-094402 (filed on Apr. 15, 2010), and a whole of the contents of these applications is incorporated herein by reference.

The present invention relates to a method for producing a spherical alumina powder, in which an aluminum hydroxide powder having specific physical properties is fed into flames to cause spheroidization.

DESCRIPTION OF THE RELATED ART

A spheroidized alumina powder produced by feeding an aluminum powder into flames shows excellent thermal conductivity, filling property and insulating property when they are added to a resin, and thus it is used as a filler in a resin for an insulating material such as a substrate.

As a method for producing such spherical alumina powder, for example, the following methods are known: a method in which an aluminum hydroxide slurry as a raw material is fed into flames, and then thermal spraying is performed; a method in which a slurry is made from an aluminum hydroxide powder, and the slurry is spray-fed into flames in the form of a fine mist (see JP-A-11-147711 and JP-A-2001-19425 and JP-A-2001-226117).

However, when a generally-used aluminum hydroxide is used as a raw material or water is used as a medium, a great deal of amount of heat is necessary in the course of the spheroidization. In addition, when aggregated aluminum hydroxide is used, the obtained spherical alumina may be in the form where several particles agglomerate each other.

In a spherical alumina powder used for a semiconductor application, it is necessary to decrease the uranium content to an extremely low level in order to eliminate operation errors caused by a-rays. As a method for producing such a spherical alumina powder with a low uranium content, a method in which high-purity aluminum is molten, and then the molten aluminum is atomized to produce an aluminum powder having both a uranium amount and a thorium amount of less than 1 ppb, and the resulting product is fed into an air stream including oxygen to burn is known (see JP-A-11-92136). However, the method may not be necessarily regarded as an advantageous method from the viewpoint of productivity since the method is a two-step process.

SUMMARY OF THE INVENTION

An object of the present invention is to provide a method for producing a spherical alumina powder not only capable of producing spherical alumina at high productivity, but also having a small specific surface area and a low uranium content and capable of providing a high thermal conductivity to a resin composition for a semiconductor encapsulation material.

As a result of the present inventors' intensive studies for solving the above-described problem, they have discovered that a spherical alumina powder having a small specific surface area and a low uranium content can be efficiently produced by spray-feeding an aluminum hydroxide powder having specific physical properties into flames.

That is, the present invention provides a method for producing a spherical alumina powder comprising the steps of: spraying an aluminum hydroxide powder having a specific surface area measured by a nitrogen adsorption method of 0.3 $m^2/g$ or more and 3 $m^2/g$ or less; a ratio of an average particle diameter D50, which is a particle diameter at which 50% by weight of particles from the finest particle side are accumulated in a particle diameter distribution measured by a laser diffraction scattering method, to a sphere conversion particle diameter Dbet calculated from a specific surface area, D50/Dbet, of 10 or less; and the average particle diameter D50 of 2 μm or more and 100 μm or less, into flames, and then collecting it in the form of a powder.

The present invention also provides production a spherical alumina powder for adding to a resin, which has an average particle diameter D50 of 2 μm or more and 100 μm or less, which is a particle diameter at which 50% by weight of particles from the finest particle side are accumulated in a particle diameter distribution measured by a laser diffraction scattering method; a specific surface area measured by a nitrogen adsorption method of 1 $m^2/g$ or less; a ratio of the average particle diameter D50 to a sphere conversion particle diameter Dbet calculated from a specific surface area, D50/Dbet, of 5 or less; and a uranium content of 10 ppb or less.

Furthermore, the present invention provides an aluminum hydroxide powder for producing spherical alumina, which has a specific surface area measured by a nitrogen adsorption method of 0.3 $m^2/g$ or more and 3 $m^2/g$ or less; a ratio of an average particle diameter D50, which is a particle diameter at which 50% by weight of particles from the finest particle side are accumulated in a particle diameter distribution measured by a laser diffraction scattering method, to a sphere conversion particle diameter Dbet calculated from a specific surface area, D50/Dbet, of or less; a particle diameter distribution index of a particle diameter D10, which is a particle diameter at which 10% by weight of particles from the finest particle side are accumulated, and a particle diameter D90, which is a particle diameter at which 90% by weight of particles are accumulated, D90/D10, of 12 or less; a gibbsite crystal form, measured by an X-ray diffraction; and a peak intensity ratio between the crystal faces (110) and (002), I(110)/I(002), of 0.20 or more.

According to the production method of the present invention, a spherical alumina powder having a small specific surface area, a low uranium content, and a low alpha dose can be obtained at high productivity.

BRIEF DESCRIPTION OF THE DRAWING

FIG. 1 shows an exemplary apparatus for producing a spherical alumina powder in accordance with an embodiment of the present invention.

DETAILED DESCRIPTION OF THE INVENTION

Hereinafter, the present invention will be described in detail.

An aluminum hydroxide powder used as a raw material in the method of the present invention (hereinafter sometimes referred to as a "raw material aluminum hydroxide powder") has an upper limit of a specific surface area, measured by a nitrogen adsorption method, of 3 $m^2/g$ or less, preferably 2 $m^2/g$ or less. When the raw material aluminum hydroxide powder has too large a specific surface area, the specific surface area of the resulting spherical alumina powder also tends to be large. The lower limit of the specific surface area of the raw material aluminum hydroxide powder is 0.3 $m^2/g$ or more, preferably 0.5 $m^2/g$ or more. When the raw material aluminum hydroxide powder has too small a specific surface area, its physical property as a resin filler may deteriorate since the content of coarse particles having a particle diameter larger than the average particle diameter increases.

The raw material aluminum hydroxide powder used in the method of the present invention has an average particle diameter D50 of 2 μm or more and 100 μm or less, preferably 3 μm or more and 70 μm or less. In the present invention, the average particle diameter D50 (hereinafter sometimes referred to as simply "D50") refers to an average particle diameter at which 50% by weight of particles from the finest particle side are accumulated in a particle diameter distribution measured by a laser diffraction scattering method. When the average particle diameter D50 of the raw material aluminum hydroxide powder is less than 2 μm, the collection efficiency may deteriorate, whereas when it is more than 100 μm, the surface of particles may get rough upon spheroidization.

The raw material aluminum hydroxide powder used in the method of the present invention has a ratio of an average particle diameter D50 to a sphere conversion particle diameter Dbet calculated from the specific surface area, D50/Dbet, of 10 or less, preferably 8 or less, more preferably 6 or less. In the present invention, the sphere conversion particle diameter Dbet (hereinafter sometimes referred to as simply "Dbet") refers to a particle diameter calculated from the specific surface area and the true density of the raw material aluminum hydroxide, and indicates an indirectly calculated primary particle diameter. When D50/Dbet of the raw material aluminum hydroxide powder is more than 10, a spherical alumina powder having a D50/Dbet of 5 or less cannot be obtained. The lower limit of D50/Dbet is not particularly limited, but it is usually 1 or more.

A particle diameter distribution index D90/D10 of the raw material aluminum hydroxide powder used in the method of the present invention is preferably 12 or less. The lower limit of D90/D10 is not particularly limited, but it is usually 2 or more. In the present invention, D10 and D90 refer to, respectively, particle diameters at which 10% by weight and 90% by weight of particles from the finest particle side are accumulated in the particle diameter distribution measured by a laser diffraction scattering method. The value of D90/D10 is an indicator showing how large a width the particle diameter distribution has, and it means that the smaller the value, the sharper the particle diameter distribution. When the value of D90/D10 of the raw material aluminum hydroxide powder is 12 or less, a spherical alumina powder having a sharp particle diameter distribution tends to be obtained, and a yield of the powder through a cyclone increases, and thus it leads to increased productivity.

Examples of the crystal form of the raw material aluminum hydroxide powder used in the method of the present invention include trihydrates of gibbsite and bayerite, and monohydrates of boehmite and diaspore. Of these, gibbsite is preferable, since it has a relatively low hardness and thus an abrasion of a production apparatus can be prevented, and aluminum hydroxide particles having an average particle diameter of 2 μm or more can be easily obtained. When the raw material aluminum hydroxide powder contains aluminum hydroxide having a crystal form other than gibbsite, its content is preferably 5% by weight or less based on the total weight of the raw material aluminum hydroxide powder. The content of aluminum hydroxide having the different crystal form can be calculated from a main peak intensity ratio determined with an X-ray diffraction measurement.

A peak intensity ratio of a crystal face (110) to a crystal face (002), I(110)/I(002), of the raw material aluminum hydroxide powder used in the method of the present invention is preferably 0.20 or more. The peak intensity ratio I(110)/I(002) is more preferably 0.25 or more, further more preferably 0.30 or more. A powder having a peak intensity ratio of less than 0.20 shows that the crystal face (002) is a large plate. When such an aluminum hydroxide powder is subjected to spheroidization as a raw material, the resulting spherical alumina tends to have a large surface area. The peak intensity ratio is preferably 0.5 or less.

If a spherical alumina powder is used for a encapsulation material of semiconductor elements, it is necessary that the spherical alumina powder has a low alpha dose, in other words, the uranium content in the spherical alumina powder must be low. Specifically, it is desirable to limit the uranium content in the spherical alumina powder to 10 ppb or less. Since the uranium content in the spherical alumina powder depends on the uranium content in the raw material aluminum hydroxide powder, it is important to make the uranium content in aluminum hydroxide used as the raw material as low as possible in order to produce a spherical alumina powder having a low uranium content.

The uranium content of the raw material aluminum hydroxide powder used in the method of the present invention is, therefore, preferably 10 ppb or less, more preferably 8 ppb or less. A spherical alumina powder with a low alpha dose such as a spherical alumina powder having the uranium content of 10 ppb or less, which is suitable for using in a semiconductor encapsulation material, can be obtained by use of the raw material aluminum hydroxide powder having a uranium content of 10 ppb or less. The lower limit of the uranium content in the raw material aluminum hydroxide powder is not particularly limited. The smaller the lower limit, the better, but it is usually about 3 ppb.

It is known that aluminum hydroxide obtained by a Bayer process using bauxite as a raw material has a high uranium content such as several hundreds of parts per billion, as described in JP 60-246220 A. This is because an aqueous sodium aluminate solution is generally subjected to cyclic use in the Bayer process, and therefore organic compounds extracted from bauxite are gradually accumulated in the solution.

If, for example, bauxite as a raw material for obtaining an aqueous sodium aluminate solution is changed to aluminum hydroxide having a content of organic compounds of less than 0.1% by weight, the content of the organic compounds in the aqueous sodium aluminate solution can be decrease. Specifically, the content can be decreased to 10 mg/L or more and 1000 mg/L or less, preferably 10 mg/L or more and 500 mg/L or less. In addition, an aqueous sodium aluminate solution having a lower content of organic compounds can be obtained by adding an adsorbent to the aqueous solution to remove highly adsorbable organic compounds or by decomposing the organic compounds with an oxidizing agent. The uranium content in the obtained aluminum hydroxide can be decreased to 10 ppb or less by preparing the aluminum hydroxide by using the obtained aqueous sodium aluminate solution in this way.

If the spherical alumina powder is used in the electronic parts such as a semiconductor encapsulation material, it is important to decrease the amount of soluble Na from the viewpoint of moisture proof reliability. The amount of soluble Na depends on the amount of Na contained in aluminum hydroxide which is used as a raw material. For that reason, the smaller the amounts of both insoluble Na and soluble Na contained in the raw material aluminum hydroxide powder, the smaller the amount of an Na gas generated in spheroidization, and the smaller the amount of soluble Na in the obtained spherical alumina powder. The total amount of both insoluble Na and soluble Na contained in the raw material aluminum hydroxide powder used in the method of the present invention is preferably 0.20% by weight or less, more preferably 0.15% by weight or less in terms of the oxide ($Na_2O$).

The production method of the raw material aluminum hydroxide powder used in the method of the present invention is not particularly limited, and the raw material aluminum hydroxide powder can be produced by any method generally used in this field, preferably a Bayer process. Specifically, for example, the raw material aluminum hydroxide powder can be produced by adding aluminum hydroxide which is a seed to an aqueous sodium aluminate solution produced by the Bayer process, and stirring the mixture while keeping the liquid temperature at 30 to 90° C., whereby the aluminum component in the aqueous sodium aluminate solution is decomposed and precipitated. The aluminum hydroxide produced by this method usually has the gibbsite crystal form.

The raw material aluminum hydroxide powder may be further subjected to a surface treatment. In this surface treatment, any surface-treating agent generally used in this field may be used. Examples of the surface-treating agent include a silane coupling agent, a titanate coupling agent, and fatty acids such as a stearic acid. In particular, when aluminum hydroxide coated with a silane coupling agent or a titanate coupling agent is used, an effect of reducing the amount of soluble Na can be expected by forming an inorganic oxide layer on the surface of the spherical alumina powder caused by thermal decomposition of the surface-treating agent when it is fed into flames, even if the content of $Na_2O$ in the raw material aluminum hydroxide powder is high.

The method for treating the surface is not particularly limited, and both of a wet method and a dry method may be applied. From the viewpoint of productivity, the dry method is preferable. Specifically, the raw material aluminum hydroxide powder is fluidized in a supermixer or a V-type mixer, to which the surface-treating agent is added and mixed, whereby the surface treatment can be performed. In addition, for example, a method in which the surface-treating agent is added in a pulverization step using a vibrating mill or a ball mill may be exemplified.

If a coupling agent is used, the amount of the surface-treating agent is preferably 0.5% by weight or less in terms of $SiO_2$ or $TiO_2$, based on the weight of the aluminum hydroxide powder. If the amount of the surface-treating agent is more than 0.5% by weight, the surface area may decrease since the amount coating the surface increases, but particles agglomerate each other and coarse particles may be generated.

The amount of the surface-treating agent added is preferably 0.01 part by weight or more and 1 part by weight or less based on 100 parts by weight of the aluminum hydroxide powder.

The raw material aluminum hydroxide powder having the physical properties described above can be used not only in the method of the present invention but also as a raw material in the production method of spherical alumina generally used in this field. When such a powder is used in the method of the present invention, a spherical alumina powder having a small specific surface area and a low uranium content can be produced particularly efficiently.

The production method of the present invention can be performed by using, for example, an apparatus shown in FIG. 1. The production apparatus of spherical alumina powder shown in FIG. 1 includes a thermal spray furnace 1 on top of which a burner 2 is provided, the burner 2 being connected to a combustible gas feed pipe 3, a combustion supporting gas feed pipe 4 and a raw material feed pipe 5, a cyclone 6 for collecting a powder which has passed through the thermal spray furnace, a bag filter 7 and a blower 8.

Specifically, the raw material aluminum hydroxide powder dispersed in a carrier gas is fed into flames through the raw material feed pipe, whereby aluminum hydroxide can be spheroidized to produce a spherical alumina powder.

The raw material aluminum hydroxide can be fed, for example, in the form of a slurry in which the raw material aluminum hydroxide powder is dispersed in water. Meanwhile, according to the method of the present invention, the raw material aluminum hydroxide is spray-fed in the form of a powder from the viewpoint of productivity since there is no heat loss caused by latent heat of evaporation of water in the thermal spraying.

The amount of water contained in the raw material aluminum hydroxide powder is preferably 0.5% by weight or less, since the adhesion between particles weakens and thus the formation of the coarse particles generated by agglomeration of the particles when the powder is fed into the flames can be inhibited.

The raw material aluminum hydroxide powder is spray-fed into flames by means of a carrier gas. Examples of the carrier gas include oxygen, air, and nitrogen, and it is preferable to use oxygen. The concentration of the aluminum hydroxide powder dispersed in the carrier gas (an amount of the aluminum hydroxide powder fed (g)/an amount of the carrier gas fed (NL)) is preferably 1.0 or more and 10.0 or less. If the concentration is too high, the concentration of the aluminum hydroxide powder in the carrier gas becomes high, and the dispersibility of the powder deteriorates when it is fed into flames to cause fusion of the powder in the course of the spheroidization, and thus the obtained spherical alumina powder tends to have a large particle diameter.

With respect to the amount of the raw material aluminum hydroxide powder fed into flames, the concentration in the flames (an amount of the aluminum hydroxide powder fed (g)/an amount of the gas fed (NL)) is preferably 0.01 or more and 2.0 or less, more preferably 0.1 or more and 1.5 or less. The amount of the gas fed refers to the total amount of the combustible gas fed, the combustion supporting gas fed and the carrier gas fed. If the concentration is too low, the productivity deteriorates since the amount of the raw material aluminum hydroxide powder fed is not enough. On the other hand, if it is too high, the amount of the raw material aluminum hydroxide powder which is brought into contact with flames at once increases, thus the particles fuse to each other, and the particle diameter of the obtained spherical alumina powder tends to be large.

With respect to the amount of the raw material aluminum hydroxide powder fed into the flames, a combustible gas ratio (an amount of the aluminum hydroxide powder fed (g)/an amount of the combustible gas fed (NL)) is preferably 10.0 or less, more preferably 6.0 or less. If the combustible gas ratio is too high, the amount of the aluminum hydroxide powder fed into the flames at once increases and it is difficult to spheroidize the whole amount thereof. The lower limit of the combustible gas ratio is usually 0.1 or more from the viewpoint of productivity.

In the method of the present invention, examples of the combustible gas include propane, butane, propylene, acetylene, and hydrogen. Of these, propane (for example, a liquefied propane gas (LPG)) is preferable. Examples of the combustion supporting gas include air and oxygen. Of these, oxygen is preferable. The feed conditions of the combustible gas and the combustion supporting gas can be appropriately decided according to, for example, the production amount. The conditions may be generally adjusted in accordance with the amount of the raw material powder that has been fed.

The raw material aluminum hydroxide powder sprayed into the flames is converted into alumina due to the flames having a high temperature, and is spheroidized into a spherical alumina powder. The thus obtained spherical alumina powder is sucked through a blower and collected in a cyclone. The powder which has not been collected in the cyclone is collected through a bag filter, and the exhaust gas is released into the air.

The spherical alumina powder of the present invention has a specific surface area measured by a nitrogen adsorption method of 1 $m^2/g$ or less, preferably 0.8 $m^2/g$ or less. If the specific surface area is 1 $m^2/g$ or less, it is possible to inhibit deterioration of mechanical properties of a resin material when the powder is mixed into the resin material.

The spherical alumina powder of the present invention has an average particle diameter D50 of 2 μm or more and 100 μm or less, preferably 3 μm or more and 70 μm or less. Here, the average particle diameter D50 means the same as defined above. If the spherical alumina powder has an average particle diameter D50 of less than 2 μm, the surface area is large, and thus the mechanical properties may deteriorate when the powder is added to a resin material, whereas if the powder has a D50 of more than 100 μm, flatness of the spherical alumina particle surface may deteriorate.

The spherical alumina powder of the present invention has a particle diameter distribution index D90/D10 of preferably 4.0 or less, more preferably 3.5 or less. Here, D10 and D90 mean the same as defined above. The lower limit of D90/D10 is not particularly limited, but it is usually 1.5 or more.

The spherical alumina powder of the present invention has a ratio of the average particle diameter D50 to a Dbet calculated from the specific surface area, D50/Dbet, of 5 or less, preferably 4 or less. Here, the Dbet calculated from the specific surface area mean the same as defined above. If D50/Dbet is more than 5, contents of fine particles or coarse particles increase due to the broad particle diameter distribution. The lower limit of D50/Dbet is not particularly limited, but it is usually 1 or more.

Regarding a relationship of an average particle diameter D50(a) of the raw material aluminum hydroxide powder to an average particle diameter D50(b) of the spherical alumina powder produced by spray-feeding the raw material aluminum hydroxide powder into flames, in the present method, D50(a)/D50(b) is preferably 0.7 or more and 1.3 or less, more preferably 0.8 or more and 1.2 or more. If D50(a)/D50(b) is not within the range described above, it may be difficult to control a particle diameter of the spherical alumina powder by adjusting a particle diameter of the raw material aluminum hydroxide powder. In the conventional method, if increasing the collection efficiency of the cyclone, D50(a)/D50(b) may not be 0.7 or more and 1.3 or less, and therefore it may be difficult to control a particle diameter of the spherical alumina powder by adjusting a particle diameter of the raw material aluminum hydroxide powder, whereas if D50(a)/D50(b) is controlled to 0.7 or more and 1.3 or less, the collection efficiency of the cyclone may deteriorate. According to the present method, a spherical alumina powder can be produced with high collection efficiency while D50(a)/D50(b) is controlled to 0.7 or more and 1.3 or less.

The uranium content of the spherical alumina powder of the present invention is 10 ppb or less, preferably 8 ppb or less. The powder having the uranium content of 10 ppb or less is preferably used for encapsulation materials of semiconductors, since it is possible to prevent the operation errors of semiconductor elements. The uranium amount in the spherical alumina powder can be quantified by known methods such as glow-discharge mass spectrometry, inductively-coupled plasma mass spectrometry or fluorometry. Of these, the inductively-coupled plasma mass spectrometry is preferable since its lower limit of determination is low.

The spherical alumina powder of the present invention preferably has a sphericity of 0.90 or more in a particle diameter range of 3 μm to 20 μm since its filling property to a resin may be improved.

The soluble Na amount of spherical alumina powder of the present invention is preferably 500 ppm or less, more preferably 200 ppm or less. The soluble Na amount refers to an amount of $Na^+$ ions dissolved in water when the powder is brought into contact with water. If the amount of soluble Na contained in the spherical alumina powder is within the range described above, deterioration of an insulating property can be inhibited when the powder is added to a resin. If the obtained spherical alumina powder has insufficient moisture proof reliability, soluble Na adhered to the surface can be removed by a known method such as washing with water.

The spherical alumina powder of the present invention can be particularly efficiently produced by the production method of the present invention.

The spherical alumina powder of the present invention is suitable for using as a resin filler, and can be applied to various resins. Specific examples of the resin include thermoplastic resins such as polyolefin resins typified by polyethylene and polypropylene, and acrylic resins; thermosetting resins such as epoxy resins and phenol resins; and silicone resins formed of an organic silicon compound. When the spherical alumina powder of the present invention is added to these resins, high thermal conductivity and high insulating property can be provided to the resins, and therefore they are particularly preferably used as a cooling member used in electronic parts.

Using any known methods generally used, the spherical alumina powder of the present invention is mixed with a resin, whereby a resin composition can be obtained. For example, when the resin is in the form of a liquid such as a liquid epoxy resin, the liquid resin, the spherical alumina powder and a curing agent is mixed with each other, and then the mixture is cured by heat or ultraviolet rays to obtain a resin composition. Any known curing agents, mixing methods, and curing methods can be used. On the other hand, if the resin is in the form of a solid such as a polyolefin resin or an acrylic resin, the spherical alumina powder and the resin are mixed with each other, and then the mixture is kneaded by any known methods such as melt-kneading, whereby a desired resin composition can be obtained.

The mixing ratio of the spherical alumina powder of the present invention to the resin is preferably 90 to 20% by volume of the spherical alumina powder based on 10 to 80% by volume of the resin, since thermal conductivity can be improved without deterioration of resin-specific flexibility.

EXAMPLES

The present invention will be described in more detail by way of the Examples.
(1) Average Particle diameter (D50), Particle Diameter at 10% by Weight (D10), Particle Diameter at 90% by Weight (D90)

The particle diameter was measured by using a laser scattering particle diameter distribution analyzer ("Microtrac HRA X-100" manufactured by Nikkiso Co., Ltd.). A powder to be measured was added to an aqueous solution containing 0.2% by weight of sodium hexametaphosphate, and the concentration thereof was adjusted to a measurable level. An ultrasonic wave with an output of 40 W was irradiated to the sample for 5 minutes, and the measurement was performed (n=2). The average value was indicated as the particle diameter. When the particle diameter was measured for the raw material aluminum hydroxide powder, the refractive index was 1.57, and when the particle diameter was measured for the spherical alumina powder, it was 1.76.

D50 value was determined from a particle diameter at which 50% by weight particles from the finest particle side were accumulated. D10 and D90 were determined from the particle diameter distribution as a step of [log(particle diameter)] of 0.038.

(2) Specific Surface Area

The specific surface area was determined in accordance with JIS-Z-8830 by a nitrogen adsorption method.

(3) Dbet

Dbet (μm) was calculated from the following formula.

$$6/[\text{specific surface area } (m^2/g) \times \text{true density of powder } (g/cm^3)]$$

The true densities of raw material aluminum hydroxide and spherical alumina were 2.4 and 3.7, respectively.

(4) Measurement of Powder X-Ray Diffraction

Using a powder X-ray diffraction analyzer ("RINT-2000" manufactured by Rigaku Corporation), an aluminum hydroxide powder was filled in a glass cell for measurement with compaction, and then the measurement was performed under the following conditions. Cu was used as an X-ray source.

(Measurement Conditions)
    Step width: 0.02 deg
    Scan speed: 0.04 deg/second
    Acceleration voltage: 40 kV
    Acceleration current: 30 mA (5) Peak Intensity Ratio I(110)/I(002)

From the results of the powder X-ray diffraction measurement, comparing with a JCPDS card No. 70-2038, a peak appearing at a position when $2\theta$ is 18.3° was defined as a crystal face (002), and a peak appearing at a position when $2\theta$ is 20.3° was defined as a crystal face (110). A peak intensity ratio I(110)/I(002) was determined from the peak heights.

(6) $Na_2O$ Content

An aluminum hydroxide powder was calcined in an air atmosphere at 1100° C. for 2 hours, and then the content of $Na_2O$ in the aluminum hydroxide powder was determined in accordance with JIS-R9301-3-9.

(7) Soluble Na Amount

To 10 mL of pure water with an ordinary temperature was added 1 g of a spherical alumina powder, and the mixture was stirred for 10 seconds. Then, solid-liquid separation was performed by centrifugation and the resulting supernatant was taken. Soluble Na extracted in the liquid was measured by using ion chromatography.

(8) Uranium Content

An aluminum hydroxide powder or a spherical alumina powder was heated in a mixed aqueous solution of sulfuric acid and phosphoric acid to dissolve the powder therein, thereby preparing an aqueous solution. Then, the resulting aqueous solution was brought into contact with a cyclohexane solution containing tributyl phosphate, which is generally used as an agent for extracting uranium, to extract uranium contained in the aqueous solution. After that, the extract was again brought into contact with pure water. The uranium transferred into an aqueous phase by the back extraction was measured using ICP-MS with a U238 amu intensity. For making a calibration curve, a standard solution manufacture by SPEX was used.

(9) Collection Efficiency

The collection efficiency (%) in a cyclone was calculated from the following calculation formula.

Collection efficiency (%)=[collection amount in cyclone (g)]/[amount of raw material fed (g)× 102/156]×100

Wherein 102 is the molecular weight of alumina, and 156 is the molecular weight of gibbsite form aluminum hydroxide.

Example 1

As raw material aluminum hydroxide, a gibbsite form aluminum hydroxide powder which was surface-treated with 0.1% by weight (in terms of $SiO_2$) of a silane coupling agent and has physical properties of a specific surface area of 1.2 $m^2/g$, a D10 of 1.5 μm, a D50 of 8.8 μm, a D90 of 17 μm, a D50/Dbet of 4.2, a D90/D10 of 11, a peak intensity ratio I(110)/I(002) of 0.38, an $Na_2O$ content of 0.16% by weight, and a uranium content of 5 ppb was used. The aluminum hydroxide powder was fed into a high temperature flame composed of a combustible gas and a combustion supporting gas, having a temperature of 1500° C. or more, and spheroidized. The conditions were as follows.

(1) concentration in the carrier gas (amount of the aluminum hydroxide powder fed (g)/amount of the carrier gas fed (NL)): 4.0

(2) concentration in the flames (amount of the aluminum hydroxide powder fed (g)/amount of the gases fed (NL)): 0.4

(3) ratio of the combustible gas (amount of the aluminum hydroxide powder fed (g)/amount of the combustible gas fed (NL)): 2.4

(4) ratio of the combustible gas/the combustion supporting gas: 0.23

As the combustible gas, LPG was used, and as the combustion supporting gas and the carrier gas, oxygen was used. After that, the resulting powder was collected in a cyclone to obtain a spherical alumina powder. The collection efficiency of the cyclone was 84%.

The obtained spherical alumina powder had physical properties of a specific surface area of 0.6 $m^2/g$, a D50 of 7.7 μm, a D50/Dbet of 2.7, a D90/D10 of 2.8, a soluble Na amount of 139 ppm, and a uranium content of 7 ppb.

Example 2

A spherical alumina powder was obtained in the same manner as in Example 1 except that a gibbsite form aluminum hydroxide powder having physical properties shown in Table 1, which had not been surface-treated, was used as the raw material aluminum hydroxide powder. The collection efficiency of the cyclone was 81%. Physical properties of the obtained spherical alumina powder are shown in Table 2.

Comparative Example 1

A spherical alumina powder was obtained in the same manner as in Example 1 except that a gibbsite form aluminum hydroxide powder having physical properties shown in Table 1, which had not been surface-treated, was used as the raw material aluminum hydroxide powder. The collection efficiency of the cyclone was 72%. Physical properties of the obtained spherical alumina powder are shown in Table 2.

TABLE 1

Physical Property Values of Raw Material Aluminum Hydroxide Powder

|  | Example 1 | Example 2 | Comparative Example 1 |
|---|---|---|---|
| Specific surface area ($m^2/g$) | 1.2 | 1.3 | 3.5 |
| D10 (μm) | 1.5 | 1.1 | 1.6 |
| D50 (μm) | 8.8 | 4.4 | 7.8 |
| D90 (μm) | 17 | 7.4 | 27 |
| D90/D10 | 11 | 7.1 | 17 |
| Dbet (μm) | 2.1 | 1.9 | 0.7 |
| D50/Dbet | 4.2 | 2.3 | 11 |
| Peak intensity ratio | 0.38 | 0.42 | 0.19 |
| $Na_2O$ content (% by weight) | 0.16 | 0.05 | 0.17 |
| uranium content (ppb) | 5 | 5 | 340 |

TABLE 2

Physical Property Values of Spherical Alumina Powder

| Spherical alumina powder | Example 1 | Example 2 | Comparative Example 1 |
|---|---|---|---|
| Specific surface area ($m^2/g$) | 0.6 | 0.7 | 1.4 |
| D50 (μm) | 7.7 | 5.4 | 9.6 |
| Dbet (μm) | 2.8 | 2.2 | 1.1 |
| D50/Dbet | 2.7 | 2.4 | 8.5 |
| D90/D10 | 2.8 | 3.1 | 4.2 |
| Collection efficiency of cyclone (%) | 84 | 81 | 72 |
| Soluble Na amount (ppm) | 139 | 75 | 219 |
| Uranium content (ppb) | 7 | ≤3 | 370 |

From the results shown in Table 2, it was confirmed that according to the production method of the present invention, a spherical alumina powder having a small specific surface area and a low uranium content can be produced with high productivity.

According to the production method of the present invention, a spherical alumina powder having a small specific surface area, a low uranium content, and a low alpha dose can be provided.

What is claimed is:

1. A spherical alumina powder for adding to a resin, which has an average particle diameter D50, which is a particle diameter at which 50% by weight of particles from the finest particle side are accumulated in a particle diameter distribution measured by a laser diffraction scattering method, of 2 μm or more and 100 μm or less; a specific surface area measured by a nitrogen adsorption method of 1 $m^2/g$ or less; a ratio of the average particle diameter D50 to a sphere conversion particle diameter Dbet calculated from a specific surface area, D50/Dbet, of 5 or less; and a uranium content of 10 ppb or less.

2. A method for producing a spherical alumina powder according to claim 1, comprising the steps of:
spraying an aluminum hydroxide powder having a specific surface area measured by a nitrogen adsorption method of 0.3 $m^2/g$ or more and 3 $m^2/g$ or less; a ratio of an average particle diameter D50, which is a particle diameter at which 50% by weight of particles from the finest particle side are accumulated in a particle diameter distribution measured by a laser diffraction scattering method, to a sphere conversion particle diameter Dbet calculated from a specific surface area, D50/Dbet, of 10 or less; and the average particle diameter D50 of 2 μm or more and 100 μm or less, into flames, and then,
collecting the spherical alumina powder.

3. The production method according to claim 2, wherein the aluminum hydroxide powder has a gibbsite crystal form which is measured by powder X-ray diffraction and a peak intensity ratio of the crystal face (110) to the crystal face (002), I(110)/I(002), of 0.20 or more.

4. The production method according to claim 2, wherein the aluminum hydroxide powder has a particle diameter distribution index of a particle diameter D10, which is a particle diameter at which 10% by weight of particles from the finest particle side are accumulated in a particle diameter distribution measured by a laser diffraction scattering method and a particle diameter D90, which is a particle diameter at which 90% by weight of particles are accumulated, D90/D10, of 12 or less.

5. The production method according to claim 2, wherein the aluminum hydroxide powder has a uranium content of 10 ppb or less.

* * * * *